US010411885B2

(12) United States Patent
Zhu et al.

(10) Patent No.: US 10,411,885 B2
(45) Date of Patent: Sep. 10, 2019

(54) METHOD AND SYSTEM FOR GROUP-ORIENTED ENCRYPTION AND DECRYPTION WITH SELECTION AND EXCLUSION FUNCTIONS

(71) Applicant: UNIVERSITY OF SCIENCE AND TECHNOLOGY BEIJING, Beijing (CN)

(72) Inventors: Yan Zhu, Beijing (CN); Feng Pu, Beijing (CN); Ruyun Yu, Beijing (CN); Dandan Li, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 267 days.

(21) Appl. No.: 15/543,223

(22) PCT Filed: Nov. 5, 2015

(86) PCT No.: PCT/CN2015/093838
§ 371 (c)(1),
(2) Date: Jul. 12, 2017

(87) PCT Pub. No.: WO2016/112734
PCT Pub. Date: Jul. 21, 2016

(65) Prior Publication Data
US 2018/0006811 A1    Jan. 4, 2018

(30) Foreign Application Priority Data

Jan. 12, 2015   (CN) .......................... 2015 1 0012649

(51) Int. Cl.
*H04L 29/06*   (2006.01)
*H04L 9/08*    (2006.01)
(Continued)

(52) U.S. Cl.
CPC .............. *H04L 9/0833* (2013.01); *H04L 9/14* (2013.01); *H04L 29/06* (2013.01);
(Continued)

(58) Field of Classification Search
CPC ......... H04L 9/0833; H04L 9/14; H04L 29/06; H04L 63/0442
See application file for complete search history.

(56) References Cited

U.S. PATENT DOCUMENTS 6,782,475 B1 *   8/2004  Sumner .................. H04L 12/18
                                                    380/255
2005/0220300 A1 * 10/2005  Lipson .................... H04L 9/28
                                                    380/30
(Continued)

FOREIGN PATENT DOCUMENTS

CN        104038341 A       9/2014
CN        104135473 A      11/2014
WO      2007/053836 A2      5/2007

OTHER PUBLICATIONS

Zhang, et al., an Identity-based Broadcast Encryption Protocol for Ad Hoc Networks, The 9th International Conference for Young Computer Scientists, IEEE 2008. (Year: 2008).*

*Primary Examiner* — Chau Le
*Assistant Examiner* — Vance M Little
(74) *Attorney, Agent, or Firm* — Novick, Kim & Lee, PLLC; Allen Xue

(57) ABSTRACT

A method and system for group-oriented encryption and decryption that supports the implementation of the designation and revocation functions of decryption users in a large-scale group. During the encryption, the system acquires a corresponding aggregate function according to an encryption mode; acquires any selected subset S and public parameters, and outputs an aggregate value of the subset S; generates a ciphertext of to-be-transmitted information
(Continued)

according to the public parameters, a to-be-transmitted message and the aggregate value; acquires the encryption mode and the subset S comprised in the received ciphertext, operates the subset S and an identity of a current decryptor according to the encryption mode, and outputs a new subset S'; acquires an aggregate function corresponding to the encryption mode during the decryption; outputs an aggregate value of the new subset S'; and decrypts the received ciphertext according to the public parameters and the aggregate value, so as to obtain the to-be-transmitted information.

9 Claims, 2 Drawing Sheets

(51) Int. Cl.
*H04L 9/14* (2006.01)
*H04L 12/18* (2006.01)

(52) U.S. Cl.
CPC .......... *H04L 63/0442* (2013.01); *H04L 12/18* (2013.01); *H04L 63/065* (2013.01); *H04L 2209/601* (2013.01)

(56) References Cited

U.S. PATENT DOCUMENTS

| | | | |
|---|---|---|---|
| 2010/0098253 A1* | 4/2010 | Delerablee | H04L 9/3073 380/259 |
| 2010/0272260 A1* | 10/2010 | Cao | H04H 60/15 380/259 |
| 2011/0238985 A1* | 9/2011 | Sovio | H04N 21/2347 713/168 |
| 2014/0052996 A1* | 2/2014 | Nin | G06F 21/10 713/189 |

* cited by examiner

METHOD AND SYSTEM FOR GROUP-ORIENTED ENCRYPTION AND DECRYPTION WITH SELECTION AND EXCLUSION FUNCTIONS

TECHNICAL FIELD

The presently claimed invention relates generally to information technology. The invention also refers to a method and system for group-oriented encryption and decryption with selection and exclusion functions.

RELATED ART

Group-oriented encryption is a secure communication approach in a large scale group, including secure distribution of message or Email on the Internet, multimedia broadcast transmission, selective information subscription via television or broadcast network, as well as dynamic and adaptive secure communication in mobile network. As a basic technology to ensure the security of information assets under network environment and computer system, group-oriented encryption can be widely applied in e-commerce, e-government, online transactions, and even military network.

By establishing a cryptographic system, group-oriented encryption provides each user a unique and exclusive key, and also a public key shared by all users; on this basis, the public key is available to every user for encrypting messages and air broadcasting them through public channel, but the messages could only be decrypted by valid authorized users. The process of authorizing all users in a large-scale group to decrypt messages is called broadcast encryption. However, in usual cases, group-oriented encryption is expected to have the following operation modes:

Select-mode: refers to the encryption process of selecting a specified group of users as authorized receivers (defined as authorized subset) to decrypt the messages, also called "Selective" encryption.

Exclude-mode: refers to the encryption process of designating a specified group of users as non-authorized receivers, except for whom all other receivers can decrypt the messages, also called "Exclusive" encryption.

The group-oriented encryption system is fundamentally different from traditional encryption systems. For instance, the key structure of the traditional public key encryption systems (e.g., RSA, ElGamal, ECC, etc.) consists of one public key and one corresponding private key; Again, the secret key encryption systems (e.g., DES, AES, etc.) are based on sharing a common secret key between encryptors and decryptors. Therefore, the key structure of encryption and decryption in the traditional encryption systems is 1:1, but that of group-oriented encryption is 1:n, featured as 1 pubic key corresponding to n unique private keys. Such a key structure is equipped with more security functions, for example, the n private keys provide much better support for receiver-selection, in other words, the encryption/decryption with designated-users can be realized by controlling which key can decrypt the encrypted messages.

The key distribution also enjoys more convenience in the group-oriented encryption. To achieve group-oriented encryption for n users in traditional 1:1 encryption systems, each user needs to store his/her own key and all (n−1) public keys (for public key cryptosystem) or (n−1) secret keys (for secret key cryptosystem) of other users, so the total number of keys in the system reaches $n^2$. However, to achieve the above function in the group-oriented cryptosystem, each user only needs to store one own private key and one public key, so the total number of keys in the system is streamlined to n+1. Therefore, the key management can be simplified by significantly declining the number of stored keys for both each user and the whole system.

The significant structural changes led to the great difficulty for implementing the group-oriented public-key cryptosystem. For example, how many users can be supported by the group-oriented cryptosystem, how many receivers can be authorized for decrypting messages during encryption each time, whether the "Selection" and "Exclusion" functions are compatible, whether the length of ciphertexts and keys are relevant to the scale of the group, etc. The above-mentioned problems are still unsolvable in existing group-oriented cryptosystem, but our invention leads to optimal results for all these problems.

Content of the Invention

To fix the problems described above, the embodiment of the present invention is to provide a method and system for performing group-oriented encryption and decryption with designation and revocation functions, realizing selective group encryption and promoting the security of group-oriented encryption.

To achieve the above-mentioned purpose, the embodiment of the present invention is to provide a method for performing group-oriented encryption and decryption with selection and exclusion functions, comprising:

acquiring an encryption mode of a to-be-transmitted message, and setting an aggregation function corresponding to the encryption mode during encryption according to a preset mapping relationship between the encryption mode and the aggregation function;

acquiring any selected subset S and public parameters, and outputting an aggregated value of the subset S by using the acquired aggregation function corresponding to the encryption mode during encryption, the subset S and the public parameters;

generating a ciphertext of the to-be-transmitted message according to the public parameters, the to-be-transmitted message and the aggregated value of the subset S;

receiving the ciphertext, acquiring the encryption mode and the subset S comprised in the received ciphertext, and operating the subset S and an identity of a current decryptor according to the encryption mode to output a new subset S';

acquiring an aggregation function corresponding to the encryption mode during decryption according to the preset mapping relationship between the encryption mode and the aggregation function;

acquiring the public parameters, and outputting an aggregated value of the new subset S' by using the acquired aggregation function corresponding to the encryption mode during decryption, the new subset S' and the public parameters; and acquiring a private decryption key of the current decryptor, decrypting the received ciphertext according to the public parameters, the aggregated value of the new subset S' and the private decryption key, so as to obtain the to-be-transmitted message.

Further, the encryption mode comprises two modes: a Select-mode and an Exclude-mode;

if the encryption mode is the Select-mode, it means that: only users in the subset S are allowed to decrypt the received ciphertext; and if the subset S is a set of all users in the group, it means that all users in the group are selected to decrypt the received ciphertext;

if the encryption mode is the Exclude-mode, it means that: any other users in the group except those in the subset S are allowed to decrypt the received ciphertext; if the subset S is null, it means that: no user in the group is excluded to decrypt the received ciphertext;

during the encryption, the preset mapping relationship between the encryption mode and the aggregation function comprises:

the Select-mode maps a poles-based aggregation function; and the Exclude-mode maps a zeros-based aggregation function;

Further, the acquiring any selected subset S and public parameters, and outputting an aggregated value of the subset S by using the acquired aggregation function, the subset S and the public parameters comprises:

if the acquired encryption mode is the Select-mode, invoking a poles-based aggregation function to output an aggregated value of the subset S according to any selected subset S and the public parameters; and if the acquired encryption mode is the Exclude-mode, invoking a zeros-based aggregation function to output an aggregated value of the subset S according to any selected subset S and the public parameters.

Further, the operating the subset S and an identity of a current decryptor according to the encryption mode to output a new subset S' comprises:

if the acquired encryption mode is the Select-mode and an identity ID of a current decryptor belongs to the subset S, i.e., $ID \in S$, operating the identity ID and the subset S to obtain a new subset $S\_'=S \setminus \{ID\}$; and if the acquired encryption mode is the Exclude-mode and the identity ID of the current decryptor does not belong to the subset S, i.e. $ID \notin S$, operating the identity ID and the subset S to obtain a new subset $S_+'=S \cup \{ID\}$.

Further, during the decryption, the preset mapping relationship between the encryption mode and the aggregation function comprises:

a Select-mode maps a zeros-based aggregation function; and an Exclude-mode maps a poles-based aggregation function;

wherein the acquiring the public parameters, and outputting an aggregated value of the new subset S' by using the acquired aggregation function, the new subset S' and the public parameters comprises:

if the acquired encryption mode is the Select-mode, invoking a zeros-based aggregation function to output an aggregated value of the subset $S\_'$ according to the new subset $S\_'$ and the public parameters; and if the acquired encryption mode is the Exclude-mode, invoking a poles-based aggregation function to output an aggregated value of the subset $S_+'$ according to the new subset $S_+'$ and the public parameters.

Further, the ciphertext comprises a subset S, an encryption mode and a ciphertext body, wherein the ciphertext body is of a constant size.

Further, the acquiring a private decryption key of the current decryptor comprises:

generating a private decryption key of the current decryptor according to a unique identity of the current decryptor, wherein the private decryption key is of a constant size and unique, and supports a group-oriented cryptosystem in which multiple private decryption keys correspond to one public key; and the identity comprises an arbitrary character string; a to-be-transmitted message can be encrypted as long as a sender knows an identity of a user, and the identity is further used for generating a group, that is, this identity corresponds to one element in the group.

A method for performing group-oriented encryption with selection and exclusion functions, comprising:

acquiring an encryption mode of a to-be-transmitted message and setting an aggregation function corresponding to the encryption mode during encryption according to a preset mapping relationship between the encryption mode and the aggregation function;

acquiring any selected subset S and public parameters, and outputting an aggregated value of the subset S according to the acquired aggregation function, the subset S and the public parameters; and generating a ciphertext of the to-be-transmitted message according to the public parameters, the to-be-transmitted message and the aggregated value.

Further, A method for performing group-oriented decryption with selection and exclusion functions, comprising:

acquiring an encryption mode and a subset S comprised in a received ciphertext, operating the subset S and an identity of a current decryptor according to the encryption mode to output a new subset S'.

acquiring an aggregation function corresponding to the encryption mode during decryption according to a preset mapping relationship between the encryption mode and the aggregation function;

acquiring public parameters, and outputting an aggregated value of the new subset S' according to the acquired aggregation function, the subset S' and the public parameters; and acquiring a private decryption key of the current decryptor, and decrypting the received ciphertext according to the public parameters, the aggregated value of the new subset S' and the private decryption key, so as to obtain the to-be-transmitted message.

Further, A system for performing group-oriented encryption and decryption with selection and exclusion functions, comprising:

an encryption selection unit, which is configured to acquire an encryption mode of a to-be-transmitted message, and set an aggregation function corresponding to the encryption mode during encryption according to a preset mapping relationship between the encryption mode and the aggregation function;

an encryption aggregation unit, which is configured to acquire any selected subset S and public parameters, and output an aggregated value of the subset S by using the acquired aggregation function corresponding to the encryption mode during encryption, the subset S and the public parameters;

a ciphertext generating unit, which is configured to generate a ciphertext of the to-be-transmitted message according to the public parameters, the to-be-transmitted message and the aggregated value of the subset S;

a set operation unit, which is configured to receive the ciphertext, acquire the encryption mode and the subset S comprised in the received ciphertext, and operate the subset S and an identity of a current decryptor according to the encryption mode to output a new subset S';

a decryption selection unit, which is configured to acquire an aggregation function corresponding to the encryption mode during decryption according to the preset mapping relationship between the encryption mode and the aggregation function;

a decryption aggregation unit, which is configured to acquire the public parameters, and output an aggregated value of the new subset S' by using the acquired aggregation function corresponding to the encryption mode during decryption, the new subset S' and the public parameters; and a plaintext generating unit, which is configured to acquire a private decryption key of the current decryptor, decrypt the received ciphertext according to the public parameters, the aggregated value of the new subset S' and the private decryption key, so as to obtain the to-be-transmitted message.

The advantages of the above-mentioned constructions of the present invention are described as follows:

In the present constructions, the implementation of the cryptographic decision-making method of positive and negative membership between element and set based on the aggregation functions, makes it possible to achieve the encryption and decryption method for selecting and excluding the authorization of specified users (the subset S) within a group, to transform the to-be-transmitted message into a ciphertext body with a constant size, so as to promote the security of group-oriented encryption;

The second advantage of the present invention is that there is no limit to the scale of users and the size of the subset S in the group of cryptosystem.

The third advantage of the present invention is that the users' identity can be represented by arbitrary character string, so the to-be-transmitted message can be encrypted as long as the sender knows the identities of the receivers, and the identities are further used for generating a group; that is, each identity corresponds to a specific element in the group.

The fourth advantage of the present invention is that according to each user's unique identity ID, the private decryption key for this user can be generated wherein the private decryption key is constant-sized and unique, it also supports the group-oriented cryptosystem in which the unlimited number of private decryption keys correspond to one public key. There is much less overhead and memory consumption for key storage or key acquisition, so that the key management is simplified. Here, each decryptor corresponds to one element in the complete set (also called the set of all users in cryptosystem).

DETAILED DESCRIPTION OF EXEMPLARY EMBODIMENTS

Figure 1:
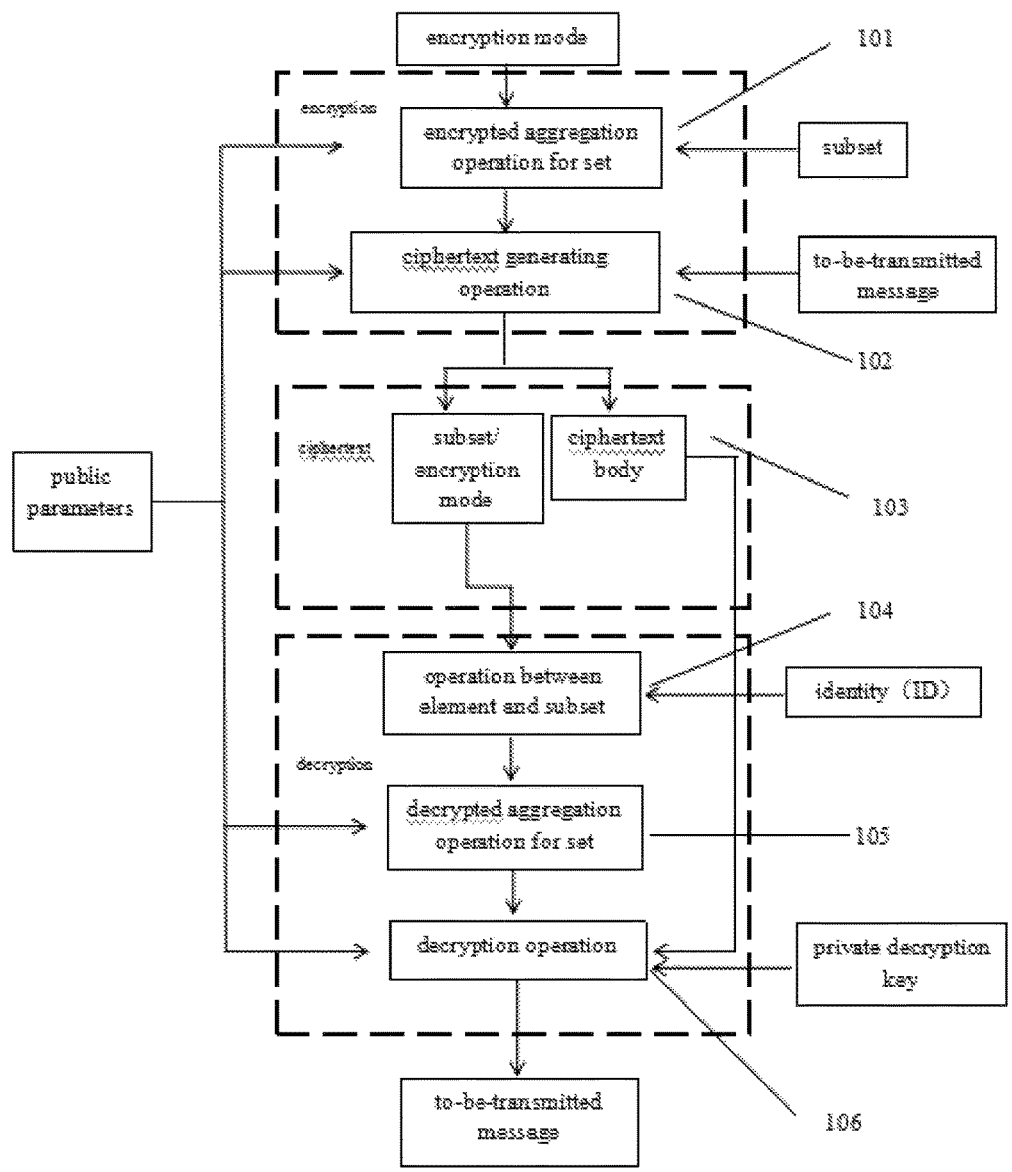
FIG. 1 is a flow diagram illustrating the method of group-oriented encryption and decryption with selection and exclusion functions in accordance with the embodiment of the invention.

In order to make the purposes, technical solutions and advantages of the present invention clearer, the present invention will be further described in detail below in combination with the accompanying drawings and the embodiments. It should be understood that the specific embodiments described herein are merely used for interpreting the present invention, rather than limiting the present invention. On the contrary, the present invention covers any substation, modification, equivalent method and solution defined by the claims within the essence and scope of the present invention. Further, in order to make the public better understand the present invention, some specific details are described below in the detail description of the present invention.

Embodiment 1

In the embodiment of the present invention, the provided method of group-oriented encryption and decryption with selection and exclusion functions comprises:

1. Acquiring the encryption mode Mode of the to-be-transmitted information M. According to the predetermined mapping between the encryption mode Mode and the aggregation function Aggregation, setting the corresponding aggregation function Aggregation corresponding to the encryption mode Mode during encrypting.

2. Acquiring any selected subset S and the public parameter mpk, the aggregated value $R_S$ of the subset S is outputted by reference to the aggregation function Aggregation corresponding to the encryption mode during encryption, the subset S and the public parameter mpk.

3. Generating the ciphertext C of the to-be-transmitted information M according to the public parameter mpk, the to-be-transmitted message M and the aggregated value $R_S$.

4. Receiving the ciphertext, acquiring the encryption mode Mode and the subset S comprised in the received ciphertext C, operating the subset S and the identity of a current decryptor according to the encryption mode Mode, and outputting a new subset S';

5. According to the predetermined mapping between the encryption mode Mode and the aggregation function Aggregation acquiring an aggregation function Aggregation corresponding to the encryption mode Mode during decryption.

6. Acquiring the public parameter mpk, and outputting the aggregated value of the new subset S' based on the aggregation function Aggregation corresponding to the encryption mode during decryption, the new subset S' and the public parameter mpk.

7. Acquiring the private key of the current decryptor, decrypting the received ciphertext C according to the public parameter mpk, the aggregated value of the new subset S' and the private decryption key, so as to acquire the to-be-transmitted information M.

According to the method of group-oriented encryption and decryption in the embodiment of the present invention, the implementation of the cryptographic decision-making method of positive and negative membership between element and set based on the aggregation functions, makes it possible to achieve the encryption and decryption method for selecting and excluding the authorization of specified users (the subset S) within a group, to transform the to-be-transmitted message into a constant-sized ciphertext body included in the ciphertext C, so as to promote the security of group-oriented encryption. Moreover, there is no limit to the scale of users and the size of the subset S in the group of cryptosystem.

In the embodiment of the present invention, the encryption mode referred includes: Select-mode and Exclude-mode.

If the encryption mode is the Select-mode ($u \in S$), it means that: only users in the subset S are allowed to decrypt the received ciphertext; and if the subset S is a set of all users in the group, it means that all users in the group are selected to decrypt the received ciphertext;

If the encryption mode is the Exclude-mode ($u \notin S$), it means that: any other users in the group except those in the subset S are allowed to decrypt the received ciphertext; if the subset S is null, it means that: no user in the group is excluded to decrypt the received ciphertext;

In the embodiment of the present invention, during the encryption of the to-be-transmitted information M, the Poles-based aggregation function will be mapped if the encryption mode is the Select-Mode; while the Zeros-based aggregation function will be mapped if the encryption mode is the Exclude-Mode. During the decryption of the ciphertext, the Zeros-based Aggregation function will be mapped if the acquired encryption mode is the Select-Mode; While the Poles-based Aggregation function will be mapped if the acquired encryption mode is the Exclude-Mode. In order that the Poles-based Aggregation function and the Zeros-based Aggregation function can be better understood, the set-based aggregation algorithm will be briefly described as follows:

For a given set $U=\{e_1, \ldots, e_n\}$ of any size (the set U denotes a complete set that consists of all users in a group or community) and the subset S of the set U (the subset S denotes a set of specified users), all elements of the set S can be aggregated into one or multiple cryptographic random numbers or random vectors through the aggregation function Aggregation. The set-based aggregate algorithm for generating the aggregation function is defined as follows:

In a cryptosystem, let PK denote the public key space over a group G and $S=\{e_1', \ldots, e_n'\} \subseteq U$ be arbitrary set of elements. The function Aggregate: $PK \times 2^U \mapsto C$ is a polynomial-time (deterministic or non-deterministic) algorithm satisfying:

$$\text{Aggregate}(mpk, S) = R_S, \quad (1)$$

where mpk is the public key in PK, $mpk \in PK$. The public parameter mpk is open for anyone to ensure that the process of aggregation function can be dealt with openly. Meanwhile, the aggregation function Aggregation is a compressing function that compresses all of elements in the set S into a constant-size random number or random vector $R_S$, that is, the outputted aggregate value $R_S$ is constant-sized, and further, the aggregation function Aggregation may be used to implement the cryptographic decision-making of "positive" and "negative" membership between an element and a set. Therefore, the cryptographic decision-making method of "positive" membership may be used to implement the encryption and decryption method with specified "selected" users, meanwhile the cryptographic decision-making method of "negative" membership may be used to implement the encryption and decryption method with specified "excluded" users. Let us see an example in group-oriented broadcast encryption. A data sender wants to send an encrypted sensitive message to all users, but only the specified users can use their private keys to decrypt received messages. To realize this, let the set S be a set of identities of these specified users. The cryptographic decision-making method of positive membership can be employed to determine whether the user's identity $e_i$ is included in the set S. If the element is in the set, the receiver can decrypt the received message; otherwise, the user, even if he has the private key, is unable to decrypt the received message.

The above-mentioned aggregate algorithm can be used to construct different aggregate functions. The embodiment of the present invention will takes Poles-based aggregation function and Zeros-based aggregation function as examples. The Poles-based aggregation function and Zeros-based aggregation function is briefly addressed as follows:

1) Zeros-Based Aggregation Function

Given any subset $S=\{e_1', e_2', \ldots, e_m'\} \subseteq U$ and a cyclic group G of prime order p, where p is a prime number, an algorithm is called Zeros-based aggregation function if there exists a polynomial-time algorithm ZeroAggr outputting $$G_S = ZerosAggr(mpk, S) = g^{\gamma \cdot \prod_{e_i' \in S}(\gamma + x_i)},$$

where g is the generator of the cyclic group G of prime order p, $\gamma$ is the introduced random secret and $x_i = hash(e_i)$ is a random point in the cryptography space converted from each element $e_i$ in the set S.

2) Poles-Based Aggregation Function

Given any subset $S=\{e_1', e_2', \ldots, e_m'\} \subseteq U$ and a cyclic group G of prime order p, where p is a prime number, an algorithm is called Poles-based aggregation function if there exists a polynomial-time algorithm PolesAggr outputting $$H_S = PolesAggr(mpk, S) = h^{\frac{1}{\prod_{e_i' \in S}(\gamma + x_i)}},$$

where h is the generator of the cyclic group G of prime order p, $\gamma$ is the introduced random secret and $x_i = hash(e_i)$ is a random point in the cryptography space converted from each element $e_i$ in the set S.

The Zeros-based and the Poles-based aggregate functions can output the aggregated value of the set S by virtue of the public parameter mpk even if the random secret $\gamma$ cannot be obtained (the random secret $\gamma$ is confidential in cryptography operations).

In the embodiment of the present invention, the public parameter mpk is absolutely essential to obtain the aggregated value of the set S. As for encryption, the public parameter mpk can be referred to as the public key.

In the embodiment of the present invention, the generic Bilinear mapping system (as a special case of the Multilinear mapping system) is adopted for our construction. Usually, such a system is defined as $\Omega = \{p, G_1, G_2, G_T, e(\cdot, \cdot)\}$, where $G_1$, $G_2$ and $G_T$ are the three multiplicative cyclic groups of prime order p, the element g is the generator of $G_1$, and the element h is the generator of $G_2$; such that the Bilinear mapping is indicated as $e: G_1 \times G_2 \mapsto G_T$. The Bilinear mapping system has the following properties:

1) Bilinear: For any a, b belong to $\square_p^*$, it can get $e(g^a, h^b) = e(g, h)^{ab}$, where, $\square_p^*$ represents the integer module p;

2) Non-degenerate: $e(g, h) \neq 1$; and

3) Computable: There is a polynomial-time algorithm to calculate $e(g, h)$.

In the embodiment of the present invention, the system of encryption and decryption is composed of the following four algorithms:

1. Setup algorithm: takes a specified security parameter (e.g., ciphertext length, etc.) as input, and outputs the master public key mpk and the master secret key msk.

2. Key-generating algorithm: takes a unique identity for the user as input, and outputs the user's private decryption key.

3. Encrypting operation: takes a set S of users, an encryption mode and a plaintext as input, and outputs a ciphertext.

4. Decrypting operation: takes a ciphertext, the set of users and the encryption mode as input during encryption. The user's private decryption key recovers the plaintext, namely, the to-be-transmitted message M, if the user satisfies the requirements specified during encryption.

(1) The Setup Algorithm of the Invention is Described as Follows:

1. To generate the Bilinear mapping system $\Omega = \{p, G_1, G_2, G_T, e(\cdot, \cdot)\}$ required by the cryptosystem, choose two elements g and h randomly in $G_1$ and $G_2$, respectively, and choose randomly two exponents $\gamma,\varepsilon$ in $Z_p^*$;

2. To calculate $R=e(g,h)^\varepsilon$;

3. To define the maximum number of the aggregated elements in subset as m (the number of elements of the subset is m), calculate $g_k=g^{\gamma^k}\in G_1$ for $k\in[1,m]$;

4. To construct the master secret key $msk=(\gamma,\varepsilon,g,g^\varepsilon)$ and the public parameter $mpk=\{\Omega,h,R,\{g_k\}_{k\in[1,m]}, pp=\varnothing\}$, where the public profile pp is the set of all individual public keys.

In the embodiment of the present invention, the public parameter mpk and the master secret key msk are constructed by using the Bilinear mapping system.

(2) The Key-Generating Algorithm is Described as Follows:

1. To acquire a given user's identity $ID_k$ and define $x_k=hash(ID_k)$, where k represents the k-th user;

2. To compute the k-th user's decryption private key is $$sk_k = g^{\frac{x_k\varepsilon}{\gamma+x_k}} \in G_1;$$

3. To compute $$H_k = h^{\frac{\varepsilon}{\gamma+x_k}} = (h^\varepsilon)^{\frac{1}{\gamma+x_k}}$$

and sets $pp_k=(ID_k,H_k)$;

4. To append $pp_k$ to the set pp in the public key, namely, $pp=pp\cup\{pp_k\}$.

In the embodiment of the present invention, each user corresponds to an element of the whole set (the set of all users in the group). The user's private decryption key can be generated according to the user's unique identity ID. The private decryption key is constant-sized and unique, and support a one-to-many (or 1:n) public/private key structure (one public encryption key corresponds to many private decryption keys). There is much less overhead and memory consumption for key storage or key acquisition, so that the key management is simplified.

In the embodiment of the present invention, arbitrary character string can be used as the user's identity. The to-be-transmitted message can be encrypted as long as the sender knows the identities of the receivers. And the identities are further used for generating a group; that is, each identity corresponds to a specific element in the group.

(3) The Encrypting Operation is Described as Follows:

In the embodiment of the present invention, the to-be-transmitted message M can be encrypted according to the encryption mode (Select-mode or Exclude-mode) selected by the sender, shown in FIG. 1. The process of encryption is described as follows:

1) Aggregation Operation for Encrypted Set 101

According to the encryption mode selected by the sender, the corresponding aggregation function is invoked as follows:

1. If the encryption mode is the Select-mode, to invoke the Poles-based aggregation function by taking as input the subset S and the public parameter mpk, and output the aggregated value $$H_S = PolesAggr(mpk, S) = h^{\varepsilon\prod_{e_i'\in S}\frac{1}{\gamma+x_i}}.$$

2. If the encryption mode is the Exclude-mode, to invoke the Zeros-based aggregation function by taking as input the subset S and the public parameter mpk, and output the aggregated value $$G_S = ZerosAggr(mpk, S) = g^{\gamma\cdot\prod_{e_i'\in S}(\gamma+x_i)}.$$

2) Ciphertext Generating Operation 102

To choose an element $t\in\square_p^*$ randomly and then compute $C_1$ and $C_2$ according to the acquired public parameter mpk and the Equation (2):

$$(C_1, C_2) = \begin{cases} (h^t, (H_S)^t) & \text{if mode = Select-Mode} \\ (h^t, (G_S)^t) & \text{if mode = Exclude-Mode} \end{cases} \quad (2)$$

Next, for the to-be-transmitted message M, to compute $C_3$ by using $C_3=M\cdot R^t$ and output the final ciphertext 103, $C=(S,Mode,C_1,C_2,C_3)$, where $C_1,C_2,C_3$ is called the ciphertext body with constant size.

(4) Decrypting Operation is Described as Follows:

In the embodiment of the present invention, the ciphertext C can be decrypted according to the acquired encryption mode, shown in FIG. 1. The process of decryption is described as follows:

Firstly, to determine the encryption mode in the received ciphertext $C=(S,Mode,C_1,C_2,C_3)$ and acquire the subset S. According to the encryption mode, it executes as follows:

1) If the Encryption Mode is the Select-Mode:

1. Operation between element and the subset 104: to verify whether the k-th user's identity $ID_k$ is in the subset S. If $ID_k\in S$ holds, then set $S'=S\setminus\{ID_k\}$;

2. Aggregation operation with decrypted set 105: to invoke the Zeros-based aggregation function by taking as input the subset $S_-'$ and the public parameter mpk, and output the aggregated value $$G_{S_-'} = ZerosAggr(mpk, S_-') = g^{\gamma\cdot\prod_{e_i'\in S_-'}(\gamma+x_i)};$$

3. Decryption operation 106: According to the acquired public parameter mpk, the private decryption key and the value $G_{S_-'}$, to recover the secret $ek'=e(sk_k,C_1)\cdot e(G_{S_-'},C_2)$ and then compute the to-be-transmitted message $M=C_3/ek'$.

2) If the Encryption Mode is the Exclude-Mode:

1. Operation between element and set 104: to verify whether the k-th user's identity $ID_k$ satisfies the relation $ID_k\notin S$. If so, then set $S_+'=S\cup\{ID_k\}$;

2. Aggregation operation for decrypted set 105: to invoke the Poles-based aggregation function by taking as input the subset $S_+'$ and the public parameter mpk, and output the aggregated value $$H_{S_+'} = PolesAggr(mpk, S_+') = h^{\varepsilon\prod_{e_i'\in S_+'}\frac{1}{(\gamma+x_i)}};$$

3. Decryption operation 106: According to the acquired public parameter mpk, the private decryption key and the value $H_{S_+'}$, to recover the secret $ek'=e(sk_k, C_1)\cdot e(C_2,H_{S_+'})$ and then compute the to-be-transmitted message $M=C_3/ek'$.

In the embodiment of the present invention, it is computationally difficult for the users excluded from S to decrypt the ciphertext when the encryption mode is the Select-mode, it means that any polynomial-time computer system might not reach it. As well, it is computationally difficult for the users in the set S to decrypt the ciphertext when the encryption mode is the Exclude-mode, that is, any polynomial-time computer system might not reach it.

The embodiment of the present invention provides a method of group-oriented encryption with any selection relationship, which makes it possible to achieve the encryption and decryption method for selecting and excluding the authorization of specified users within a group, to transform the to-be-transmitted message M into a constant-sized ciphertext C. This method also overcome the larger expense and harder management problem in the traditional cryptosystem wherein enormous key storage and acquisition are demanded, so that it can help reduce the storage consumption. More importantly, the present invention can be used in a particularly large-scale group. The invention is also available for all the users in the global Internet because there is no limit to the scale of users and the size of the subset in the group of cryptosystem. Therefore, the present invention exerts a significant impact on the secure sharing and distribution of broadcast-type information, and is of great practical application value in the Internet, mobile network, IVN (in-vehicle network) and cloud computing, etc.

Embodiment 2

The embodiment of the present invention provides a method of group-oriented encryption with selection and exclusion functions, comprising:

1. Acquiring the encryption mode Mode for the to-be-transmitted message, and setting the aggregation function Aggregation corresponding to the Mode during encryption according to the predetermined mapping between Mode and Aggregation.

2. Acquiring any selected subset S and the public parameter mpk, and outputting the aggregated $R_S$ value of the subset S based on the aggregation function Aggregation, the subset S and the public parameter mpk;

3. Generating a ciphertext C of the to-be-transmitted message M according to the public parameter mpk, the to-be-transmitted message M and the aggregated value $R_S$;

Embodiment 3

The embodiment of the present invention provides a method of group-oriented decryption with selection and exclusion functions, comprising:

1. Acquiring the encryption mode Mode and the subset S comprised in the received ciphertext C, dealing with the subset S and the identity of a current decryptor according to the Mode to output a new subset S';

2. Acquiring the aggregation function Aggregation corresponding to the Mode during decryption according to the predetermined mapping between the Mode and the Aggregation;

3. Acquiring the public parameter mpk, and outputting an aggregated value of the new subset S' based on the acquired Aggregation, the new subset S' and the public parameters mpk;

4. Acquiring the private decryption key of the current decryptor, decrypting the received ciphertext according to the public parameters mpk, the aggregated value of a new subset S' and the private decryption key, so as to recover the to-be-transmitted message M.

Embodiment 4

The present invention also provides a concrete embodiment for group-oriented encryption and decryption method with selection and exclusion functions. Considering the features of the system provided by the present invention are corresponding to those of the above-mentioned detailed description of exemplary embodiments in the method for group-oriented encryption and decryption with selection and exclusion functions, the group-oriented encryption and decryption system can achieve the purpose of the invention via carrying out the above-mentioned procedures in the detailed description of exemplary embodiments. The detailed description of exemplary embodiments might also be applicable to the corresponding system with same functions provided by the invention. Therefore, these content will not be reiterated in the following embodiment of the present invention.

Figure 2:
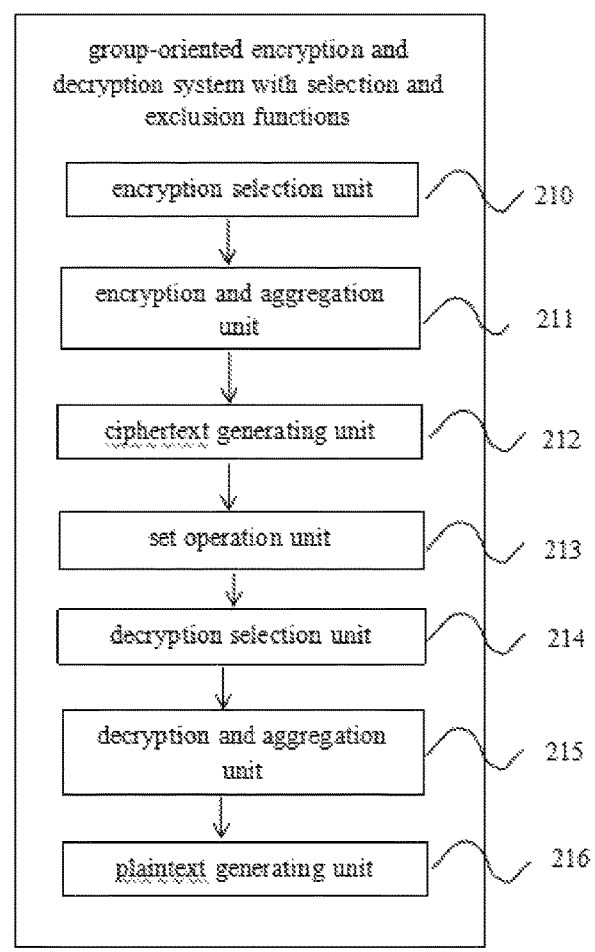
FIG. 2 is a structure diagram illustrating the system of group-oriented encryption and decryption with selection and exclusion functions in accordance with the embodiment of the invention.

As it shows in FIG. 2, the embodiment of the present invention provides a method for group-oriented encryption and decryption with selection and exclusion functions, comprising:

an encryption selection unit 201, which is configured to acquire an encryption mode of a to-be-transmitted message, and set an aggregation function corresponding to the encryption mode during encryption according to a preset mapping relationship between the encryption mode and the aggregation function;

an encryption aggregation unit 202, which is configured to acquire any selected subset S and public parameters, and output an aggregated value of the subset S by using the acquired aggregation function corresponding to the encryption mode during encryption, the subset S and the public parameters;

a ciphertext generating unit 203, which is configured to generate a ciphertext of the to-be-transmitted message according to the public parameters, the to-be-transmitted message and the aggregated value of the subset S;

a set operation unit 204, which is configured to receive the ciphertext, acquire the encryption mode and the subset S comprised in the received ciphertext, and operate the subset S and an identity of a current decryptor according to the encryption mode to output a new subset S';

a decryption selection unit 205, which is configured to acquire an aggregation function corresponding to the encryption mode during decryption according to the preset mapping relationship between the encryption mode and the aggregation function;

a decryption aggregation unit 206, which is configured to acquire the public parameters, and output an aggregated value of the new subset S' by using the acquired aggregation function corresponding to the encryption mode during decryption, the new subset S' and the public parameters; and a plaintext generating unit 207, which is configured to acquire a private decryption key of the current decryptor, decrypt the received ciphertext according to the public parameters, the aggregated value of the new subset S' and the private decryption key, so as to obtain the to-be-transmitted message.

According to the method of group-oriented encryption and decryption in the embodiment of the present invention, the implementation of the cryptographic decision-making method of positive and negative membership between element and set based on the aggregation functions makes it possible to achieve the encryption and decryption method for selecting and excluding the authorization of specified users (the subset S) within a group, to transform the to-be-transmitted message into a constant-sized ciphertext body included in the ciphertext C, so as to promote the security of group-oriented encryption. Moreover, there is no limit to the scale of users and the size of the subset S in the group of cryptosystem.

What are mentioned above are the preferred exemplary embodiments of the present invention. It should be noted that, without departing from the principle of the present invention, the general technical individual of technical field can also make some improvement and polishing, which should be regarded as the scope of protection in the present invention.

What is claimed is:

1. A method for performing group-oriented encryption and decryption with selection and exclusion functions, comprising:
    acquiring an encryption mode of a to-be-transmitted message, and setting an aggregation function corresponding to the encryption mode during encryption according to a preset mapping relationship between the encryption mode and the aggregation function;
    acquiring a selected subset S and public parameters, and outputting an aggregated value of the subset S by using the acquired aggregation function corresponding to the encryption mode during encryption, the subset S and the public parameters;
    generating a ciphertext of the to-be-transmitted message according to the public parameters, the to-be-transmitted message and the aggregated value of the subset S;
    receiving the ciphertext, acquiring the encryption mode and the subset S from the received ciphertext, and operating the subset S and an identity of a current decryptor according to the encryption mode to output a new subset S';
    acquiring an aggregation function corresponding to the encryption mode during decryption according to the preset mapping relationship between the encryption mode and the aggregation function;
    acquiring the public parameters, and outputting an aggregated value of the new subset S' by using the acquired aggregation function corresponding to the encryption mode during decryption, the new subset S' and the public parameters; and
    acquiring a private decryption key of the current decryptor, decrypting the received ciphertext according to the public parameters, the aggregated value of the new subset S' and the private decryption key, so as to obtain the to-be-transmitted message.

2. The method according to claim 1, wherein the encryption mode comprises two modes: a Select-mode and an Exclude-mode, wherein
    when the encryption mode is the Select-mode, only users in the subset S are allowed to decrypt the received ciphertext; and when the subset S is a set of all users in the group, all users in the group are selected to decrypt the received ciphertext;
    when the encryption mode is the Exclude-mode, any other users in the group except those in the subset S are allowed to decrypt the received ciphertext; and when the subset S is null, no user in the group is excluded to decrypt the received ciphertext, and wherein
    during the encryption, the preset mapping relationship between the encryption mode and the aggregation function comprises:
        the Select-mode maps a poles-based aggregation function; and
        the Exclude-mode maps a zeros-based aggregation function.

3. The method according to claim 2, wherein the acquiring the selected subset S and public parameters, and outputting an aggregated value of the subset S by using the acquired aggregation function, the subset S and the public parameters comprises:
    when the acquired encryption mode is the Select-mode, invoking a poles-based aggregation function to output an aggregated value of the subset S according to the selected subset S and the public parameters; and
    when the acquired encryption mode is the Exclude-mode, invoking a zeros-based aggregation function to output an aggregated value of the subset S according to the selected subset S and the public parameters.

4. The method according to claim 1, wherein the operating the subset S and an identity of a current decryptor according to the encryption mode to output a new subset S' comprises:
    when the acquired encryption mode is a Select-mode and an identity ID of a current decryptor belongs to the subset S, i.e., $ID \in S$, operating the identity ID and the subset S to obtain a new subset $S_-' = S \setminus \{ID\}$; and
    when the acquired encryption mode is an Exclude-mode and the identity ID of the current decryptor does not belong to the subset S, i.e. $ID \notin S$, operating the identity ID and the subset S to obtain a new subset $S_+' = S \cup \{ID\}$.

5. The method according to claim 4, wherein during the decryption, the preset mapping relationship between the encryption mode and the aggregation function comprises:
    the Select-mode maps a zeros-based aggregation function; and
    the Exclude-mode maps a poles-based aggregation function,
    wherein the acquiring the public parameters, and outputting an aggregated value of the new subset S' by using the acquired aggregation function, the new subset S' and the public parameters comprises:
        when the acquired encryption mode is the Select-mode, invoking a zeros-based aggregation function to output an aggregated value of the subset $S_-'$ according to the new subset $S_-'$ and the public parameters; and
        when the acquired encryption mode is the Exclude-mode, invoking a poles-based aggregation function to output an aggregated value of the subset $S_+'$ according to the new subset $S_+'$ and the public parameters.

6. The method according to claim 1, wherein the ciphertext comprises the subset S, an encryption mode and a ciphertext body, wherein the ciphertext body is of a constant size.

7. The method according to claim 1, wherein the acquiring a private decryption key of the current decryptor comprises:
    generating a private decryption key of the current decryptor according to a unique identity of the current decryptor, wherein the private decryption key is of a constant size and unique, and supports a group-oriented cryptosystem in which multiple private decryption keys correspond to one public key; and
    the identity comprises an arbitrary character string; a to-be-transmitted message can be encrypted as long as a sender knows an identity of a user, and the identity is further used for generating a group, that is, this identity corresponds to one element in the group.

8. A method for performing group-oriented encryption and decryption with selection and exclusion functions, comprising:

acquiring an encryption mode of a to-be-transmitted message and setting an aggregation function corresponding to the encryption mode during encryption according to a preset mapping relationship between the encryption mode and the aggregation function;

acquiring a selected subset S and public parameters, and outputting an aggregated value of the subset S according to the acquired aggregation function, the subset S and the public parameters;

generating a ciphertext of the to-be-transmitted message according to the public parameters, the to-be-transmitted message and the aggregated value;

acquiring an encryption mode and the subset S from the ciphertext, operating the subset S and an identity of a current decryptor according to the encryption mode to output a new subset S';

acquiring an aggregation function corresponding to the encryption mode during decryption according to a preset mapping relationship between the encryption mode and the aggregation function;

acquiring public parameters, and outputting an aggregated value of the new subset S' according to the acquired aggregation function, the subset S', and the public parameters; and acquiring a private decryption key of the current decryptor, and decrypting the received ciphertext according to the public parameters, the aggregated value of the new subset S', and the private decryption key, so as to obtain the to-be-transmitted message.

9. A system for performing group-oriented encryption and decryption with selection and exclusion functions, comprising:

an encryption selection application configured to acquire an encryption mode of a to-be-transmitted message, and set an aggregation function corresponding to the encryption mode during encryption according to a preset mapping relationship between the encryption mode and the aggregation function;

an encryption aggregation application configured to acquire a selected subset S and public parameters, and output an aggregated value of the subset S by using the acquired aggregation function corresponding to the encryption mode during encryption, the subset S and the public parameters;

a ciphertext generating application configured to generate a ciphertext of the to-be-transmitted message according to the public parameters, the to-be-transmitted message and the aggregated value of the subset S;

a set operation application configured to receive the ciphertext, acquire the encryption mode and the subset S from the received ciphertext, and operate the subset S and an identity of a current decryptor according to the encryption mode to output a new subset S';

a decryption selection application configured to acquire an aggregation function corresponding to the encryption mode during decryption according to the preset mapping relationship between the encryption mode and the aggregation function;

a decryption aggregation application configured to acquire the public parameters, and output an aggregated value of the new subset S' by using the acquired aggregation function corresponding to the encryption mode during decryption, the new subset S' and the public parameters; and a plaintext generating application configured to acquire a private decryption key of the current decryptor, decrypt the received ciphertext according to the public parameters, the aggregated value of the new subset S' and the private decryption key, so as to obtain the to-be-transmitted message.

* * * * *